United States Patent Office 3,490,917
Patented Jan. 20, 1970

3,490,917
FLOUR TREATMENT PROCESS
Cedric Alfred Friend Doe, Twickenham, and Judith Valerie Benoliel Russo, Isleworth, England, assignors to J. Lyons & Company Limited
No Drawing. Filed Nov. 22, 1965, Ser. No. 509,149
Claims priority, application Great Britain, Jan. 4, 1965, 230/65
Int. Cl. A21d 6/00; C13l 1/08
U.S. Cl. 99—93      13 Claims

ABSTRACT OF THE DISCLOSURE

A cake flour suitable for use in cakes and sponges having a high sugar to flour ratio is produced, without the usual chlorination, by heating starch or a cake flour in which the gluten is substantially or completely detached from the starch granules to a temperature of from 100 to 140°C for a selected period of time. The heat-treated product, to which dried gluten may be added, is used in cake formulas normally requiring chlorinated flour.

---

This invention relates to a process for the treatment of flour and starch, to the treated flour and starch obtained thereby and to cakes and sponges made from the treated flour or starch.

Cakes and sponges having a high sugar to flour ratio (usually more than 1:1) cannot be made satisfactorily from normal untreated wheat flour and it has been the practice for many years to use chlorinated flour in the commercial manufacture of such cakes and sponges. While it has never been established that the use of chlorinated flour represents a health hazard, many consider that it would be preferable to avoid its use; this has led to a prohibition of the use of chlorinated flour in a number of countries. The practice has, however, continued in countries such as Great Britain and the United States of America, because there was no practical alternative which would produce acceptable high sugar cakes.

We have now found that a simple heat treatment can be used in place of such chlorine treatment to obtain products from which cakes and sponges of high sugar to flour ratio can be successfully produced. Unlike the known chlorine treatment, however, which is applied to cake flour (however produced), the heat treatment must be applied to a flour containing a major proportion of free starch granules or granules substantially free from enveloping gluten (such as may be obtained, for example, by air classification of a normal wheat flour) or to starcn itself, the starch being derived from wheat or any other desired source. After treatment, the flour or the starch may be combined with dried viable gluten to give a "flour" having any desired protein content for use in cake and sponge recipes or the treated flour or starch may be used directly in the production of cakes and sponges together, if desired, with any desired amount of dried viable gluten.

The heat treatment essentially comprises heating the flour or starch to a temperature of from 100° to 140° C., preferably of from 110° to 135° C., and advantageously of 120° C., and then cooling it or allowing it to cool. At temperatures at the lower end of the first range mentioned, that is at temperatures from 100° C. to about 115° C., the flour or starch should be held at the temperature for about 30 minutes, while at temperatures at the upper end of the range, that is from 120° to 140° C., no holding time is necessary. The conditions of heating and cooling, including the holding time at the maximum temperature, should be such that no dextrinisation of the starting material occurs. Dextrinisation occurs if the material is over-heated and is evidenced by the development of colour (initially a pale and then a progressively darker brown) and off-taste in the product.

In practice this means that while neither the rate of heating nor the rate of cooling are critical when medium or low treatment temperatures, i.e. 125° C. or less, are used, the rate of heating to and of cooling from the treatment temperature should be as fast as possible when high treatment temperatures, i.e. 135–140° C., are used, if dextrinisation is to be avoided.

The heat treatment should be carried out under such conditions that water vapour can escape from the flour or starch. The reduction in the moisture content of the flour or starch due to the heat treatment depends upon the treatment temperaure employed. At low treatment temperatures, i.e. 100° to 105° C., the moisture content is typically reduced from a value of 10 to 12% by weight to a value of 8 or 9% by weight, while at medium and high treatment temperatures, the moisture content is typically reduced to 7% by weight or less. During or after cooling, the treated material can, if desired, be allowed to reach moisture equilibrium with the atmosphere and this will, in fact, normally be preferred in order to obtain the optimum baking results.

Heating of the starting material can be carried out in many ways, of which the following may be mentioned by way of example; (1) heating in a rotating drum, either batchwise or continuously, (2) heating in a continuous screw conveyor, the screw or screws and the jacket of which are provided with passages for the circulation of a heating medium, such as uperheated steam, (3) heating with hot air passed in counter-current to starting material, (4) heating in a hot air fluidised bed, (5) microwave heating, and (6) heating during a grinding or milling process, for example a grinding step which is part of an air classification process. Cooling can be effected by replacing the heating medium by cooling medium where appropriate in the above-described heating methods or by any other form of accelerated cooling or by natural cooling.

The treated flour or starch obtained by the present process can be used in conventional high sugar cake and sponge recipes with little or no modification of the latter; the treated flour or starch should be pre-mixed with or used in combination with the apropriate quantity of dried gluten where it is desired that the cake or sponge should have a protein content equivalent to that which would be obtained by the use of untreated wheat flour. The gelation temperature of heat treated flour and/or starch is approximately 0.5–1° C. higher than that of a comparable chlorinated flour and/or starch and in certain recipes, this necessitates a minor modification of the recipe by replacing a proportion of the whole egg, for example from 10–25% of the latter, by egg white. In the case of a few types of fruit cake, it may be desirable to add a small proportion of a thickening agent, such as pre-gelatinised starch, in order to prevent the fruit from sinking.

In order that the invention may be more fully understood, the following examples are given by way of illustration only:

In Examples 1–3, the heat treatment of the flour or starch used was carried out as follows:

Twenty pounds of cake flour or starch were placed in the hopper of a continuous twin screw conveyor, the screws and the jacket of which were steam heated, the screws with 50 lbs./sq. in. steam and the jacket with 15 lbs./sq. in. steam. The temperature of the screws was 150° C. and they were provided with small projections (1 inch long and ¼ inch high) to prevent packing of the treated material. The screws were operated to give the slowest practicable rate of throughput and the flour or starch was recirculated until the stated treatment temperaure was attained therein, this temperature being measured by a thermocouple placed near the outlet from the conveyor.

The flour or starch was then spread on trays and allowed to cool overnight exposed to the atmosphere.

EXAMPLE 1

Layer cakes were baked using various replacements for a chlorinated cake flour and were compared with a standard cake made from the following layer cake formula:

| | G. |
|---|---|
| Whole egg | 438 |
| Water | 130.5 |
| Sugar | 507 |
| Solid cake colour | 0.2 |
| Vanilla flavour | 2.0 |
| Glucose syrup (41° Bé.) | 11.25 |
| Phosphate baking powder | 15 |
| Chlorinated cake flour | 460 |
| Full fat soya flour | 18.75 |

All baking tests were made on 6½ oz. deposited weight round sponges.

The following replacements for the chlorinated cake flour were used:

(a) untreated wheat starch (405 g.) and dried viable gluten (55 g.);
(b) as (a), but the starch was heat treated as described above to a temperature of 100° C.;
(c) as (a), but the starch was heat treated as described above to a temperature of 120° C.;
(d) as (a), but the starch was heat treated as described above to a temperature of 140° C.;
(e) as (c), but the scaling weight was reduced to 6 oz.;
(f) untreated cake flour (460 g.) and with ½ of the whole egg solids replaced by albumen solids;
(g) as (f), but only ¼ of the whole egg solids were replaced by albumen solids;
(h) low protein air classified wheat flour which contained a major proportion of starch granules substantially free from enveloping gluten and which had been heat treated as described above to a temperature of 120° C. (446 g.) and dried viable gluten (14 g.);
(i) as (h) and with ⅛ of the whole egg solids replaced by albumen solids.

The cakes obtained were compared with the standard and with each other with the following results:

(a), (b), (c) and (d): all to some extent inferior to standard; (c) was the best and only slightly inferior to standard; (d) has coarse grain and "dry" eating quality.
(e): appearance and texture as good as standard.
(f): cake was small and tough.
(g): no improvement on (f).
(h): good cake, but not such good eating quality as (e).
(i): very good cake, equally as good in appearance as (e) and better flavour than (e). In addition, after keeping for 14 days, (i) was slightly better than standard.

EXAMPLE 2

High ratio cakes were baked using various replacements for a chlorinated cake flour and were compared with a standard cake made from the following high ratio cake formula:

| | G. |
|---|---|
| High ratio fat | 425 |
| Chlorinated high ratio flour | 568 |
| Castor sugar | 681 |
| Phosphate baking powder | 28 |
| Skim milk powder | 74 |
| Salt | 14 |
| Whole egg | 482 |
| Water | 308 |

The following replacements for the chlorinated flour were used:

(a) untreated high ratio flour;
(b) high ratio air classified flour which contained a major portion of starch granules free from enveloping gluten and which had been heat treated as described above to a temperature of 120° C.;
(c) as (a) and with ¼ of the whole egg solids replaced by albumen solids;
(d) as (b) and with ¼ of the whole egg solids replaced by albumen solids.

The cakes obtained were compared with the standard and with each other with the following results:

(a): unsatisfactory.
(b): unsatisfactory, substantially the same as (a).
(c): better than (a), but not satisfactory.
(d): very good, almost indistinguishable from standard.

EXAMPLE 3

Madeira cakes were baked using various replacements for a chlorinated cake flour and were compared with a standard cake made from the following maderia cake formula:

| | G. |
|---|---|
| Chlorinated cake flour | 640 |
| Full fat soya flour | 60 |
| Salt | 11.25 |
| Phosphate baking powder | 15 |
| Compound fat | 225 |
| 67% w./w. sugar/water syrup | 915 |
| Whole egg | 315 |
| Water | 60 |
| Cake colour solution | 3.15 |
| Skim milk powder | 15 |

The following replacements for the chlorinated flour were used:

(a) low protein air classified wheat flour which contained a major portion of starch granules free from enveloping gluten and which had been heat treated as described above to a temperature of 120° C. (621 g.) and gluten (19 g.) and with ⅛ of the whole egg solids replaced by albumen solids;
(b) as (a) but with ¼ of the whole egg solids replaced by albumen solids.

The cakes obtained were compared with the standard and with each other with the following results:

(a): nearly as good as standard slightly more pasty.
(b): fully equivalent to standard.

EXAMPLE 4

Air classified wheat flour containing a major proportion of free starch granules and starch granules substantially free from enveloping gluten was treated in a Scott-Rietz Thermascrew (manufactured by the Balfour Group of Leven, Scotland; a single screw conveyor heat exchanger). This apparatus comprised a single screw, 12 feet long, 8 inches in diameter and with a pitch of 6 inches, which was provided with an internal steam heated passage and which could be rotated about its axis within an enclosure extending along its length. The screw was fitted with lifter bars between adjacent pitches, the bars being aligned parallel with the axis of the screw. A part of the screw enclosure was formed by a steam heated jacket extending along the length of the enclosure and the top of the enclosure was provided with openable lids or hatches. At one end of the screw enclosure there was a hopper for the introduction of material to be treated and at the other, an outlet for treated material.

The heating passage in the screw was supplied with steam at 100 p.s.i.g. giving a temperature of 170° C. and the jacket was supplied with steam at 60 p.s.i.g. giving a temperature of 153° C. Alternate lids on the top of screw enclosure were kept open to permit the escape of moisture.

Three runs were carried out using different rates of rotation of the screw and different rates of feed, the other conditions of processing being as described above.

In the first run, the screw was rotated at 6½ r.p.m. and the flour was fed at the rate of 10 lbs. per minute.

The temperature of the flour at the outlet from the apparatus, as measured by thermometer, was 125–133° C.

In the second run, the screw was rotated at 10 r.p.m. and the flour was fed at the rate of 10 lbs. per minute. The temperature of the flour at the outlet was 115–130° C.

In the third run, the screw was rotated at 15 r.p.m. and the flour was fed at the rate of 20 lbs. per minute. The temperature of the flour at the outlet was 110–115° C.

In each case the flour was allowed to cool to room temperature in air and was then used in the baking of high sugar sponge cakes. Completely acceptable cakes were obtained with the flour obtained from each of the three runs.

EXAMPLE 5

A low protein wheat flour was subjected to simultaneous grinding, which had the effect of substantially freeing a majority of the starch granules from enveloping gluten, and heating. The apparatus used comprised a screw conveyor feeding a turbo-grinder (a fluid energy mill or impact attrition-type grinder), the air intake of which was provided with a heat exchanger for preheating the air and a means for injecting steam. The turbo-grinder was also provided with an outlet duct for treated material leading from the turbo-grinder to a conventional cyclone separator, a collector being placed beneath the bottom outlet from the cyclone separator. The ducting between the turbo-grinder and the cyclone separator was 40 feet long.

In carrying out the process, the flour was introduced via the screw conveyor and air together with some steam (to prevent excessive moisture loss in the flour) was supplied to the turbo-grinder at a temperature of about 250° C. Air and flour passed into the ducting from the turbo-grinder at a temperature of 117–122° C. and the flour was received in the collector at a temperature of about 100° C. The moisture content of the flour at this point was 3%.

After removal from the collector, the flour was allowed to reach moisture equilibrium with the atmosphere. It was then used in the baking of high sugar sponges and completely acceptable sponges were obtained.

What is claimed is:

1. A process for the preparation of a cake flour suitable for use in cakes and sponges having a high sugar to flour ratio which comprises heating a non-chlorinated cake flour containing a major proportion of starch granules free or substantially free from enveloping gluten to a temperature of from 100° C. to 140° C. and maintaining said cake flour at a temperature within said range for a selected period of time, said period being greater at the lower end of the said temperature range than at the upper end, the minimum period at a treatment temperature of 100° C. being about 30 minutes and the maximum period at any treatment temperature in the said range being such that no dextrinisation of the starch occurs.

2. A process according to claim 1, in which the cake flour is heated to a temperature of from 110° to 135° C.

3. A process according to claim 2, in which the cake flour is heated to said temperature and then immediately cooled.

4. A process according to claim 1, in which, after cooling, the heat treated flour is combined with dried viable gluten in an amount to increase the protein content to a desired level.

5. A process for the preparation of a cake flour suitable for use in cakes and sponges having a high sugar to flour ratio which comprises subjecting low protein flour to grinding to free the majority of the starch granules from enveloping gluten and during said grinding heating the flour to a temperature of from 100° to 140° C. and maintaining said flour at a temperature within said range for a selected period of time, said period being greater at the lower end of said temperature range than at the upper end, the minimum period at treatment temperature of 100° C. being about 30 minutes and the maximum period at any treatment temperature in said range being such that no dextrinisation of the starch occurs.

6. A process for the preparation of a starch suitable for use in cakes and sponges having a high sugar to flour ratio, which comprises subjecting starch in the substantial absence of other materials to a substantially dry heat treatment to heat the starch to a temperature of from 100° C. to 140° C. and maintaining said starch at a temperature within said range for a selected period of time, said period being greater at the lower end of the said temperature range than at the upper end, the minimum period at a treatment temperature of 100° C. being about 30 minutes and the maximum period at any treatment temperature in the said range being such that no dextrinisation of the starch occurs.

7. A process according to claim 6, in which the starch is heated to a temperature of from 110° to 135° C.

8. A process according to claim 7, in which the starch is heated to said temperature and then immediately cooled.

9. A process according to claim 6, in which, after cooling, the heat treated starch is combined with dried viable gluten in an amount to increase the protein content to a desired level.

10. The non-dextrinised flour produced by the process of claim 1.

11. A cake flour comprising a mixture of the flour of claim 10 and dried viable gluten in an amount to increase the protein content to a desired level.

12. The non-dextrinised starch produced by the process of claim 6.

13. A cake flour comprising a mixture of the starch of claim 12 and dried viable gluten in an amount to increase the protein content to a desired level.

References Cited

UNITED STATES PATENTS

| | | | |
|---|---|---|---|
| 1,133,914 | 3/1915 | Bergh et al. | 127—32 |
| 1,157,738 | 10/1915 | Tyler | 127—32 |
| 1,636,569 | 7/1927 | Kent et al. | 99—93 |
| 1,710,503 | 4/1929 | Kent et al. | 99—93 XR |
| 3,077,408 | 2/1963 | Rozsa et al. | 99—93 |
| 3,086,008 | 4/1963 | Opila et al. | 260—233.3 |
| 3,268,337 | 8/1966 | Howard et al. | 99—94 XR |

RAYMOND N. JONES, Primary Examiner

J. R. HOFFMAN, Assistant Examiner

U.S. Cl. X.R.

99—215; 127—32, 71